Figure 1:
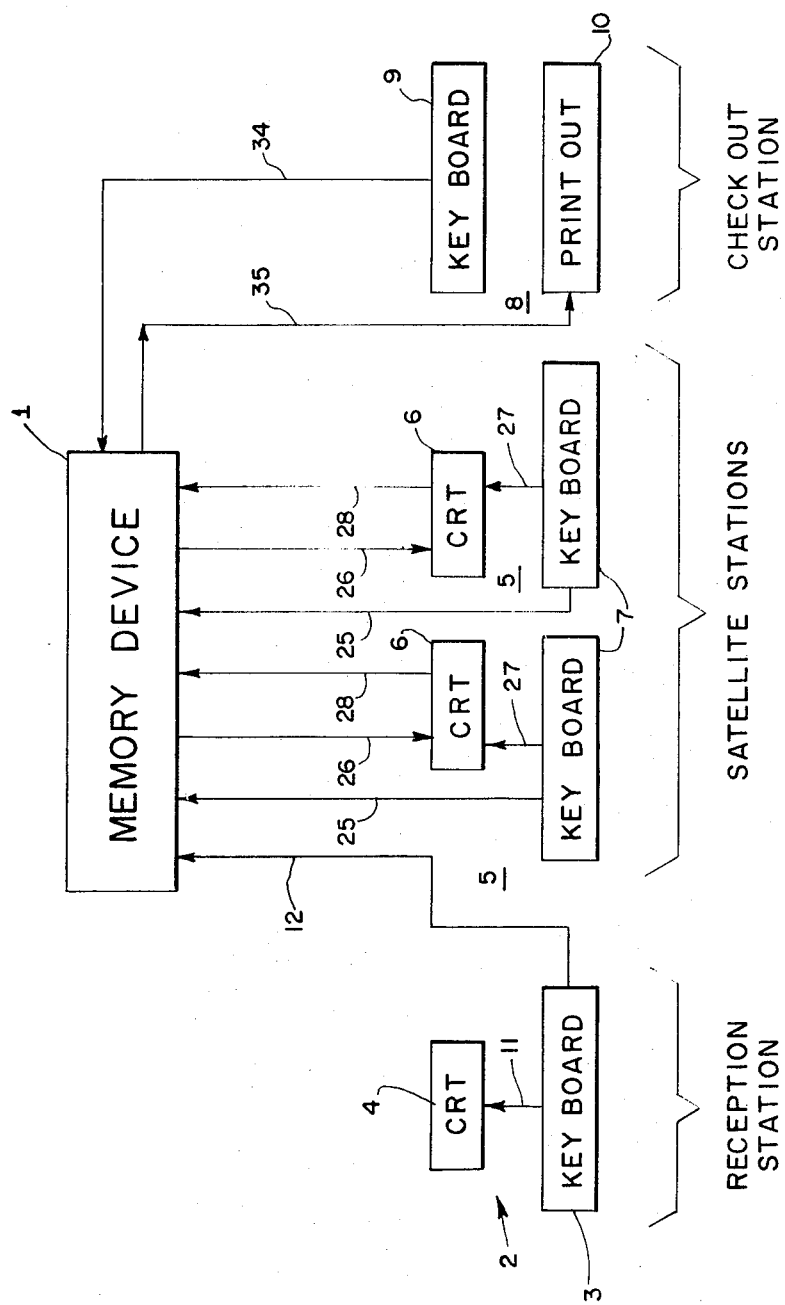

United States Patent

Comeau

[15] 3,636,315
[45] Jan. 18, 1972

[54] GUEST IDENTIFICATION APPARATUS AND METHOD

[72] Inventor: Charles P. Comeau, Oreland, Pa.

[73] Assignee: Captain International Industries, Ltd., Vancouver, British Columbia, Canada

[22] Filed: Nov. 10, 1969

[21] Appl. No.: 875,146

[52] U.S. Cl. ............... 235/61.7 B, 340/152 R, 340/173 CR, 340/149 R
[51] Int. Cl. .......................................................... G06k 15/00
[58] Field of Search ............... 340/173 CR, 172.5, 152, 149, 340/149 A, 324.1, 172.5; 235/61.7 B, 61.7

[56] References Cited

UNITED STATES PATENTS

| | | | |
|---|---|---|---|
| 3,308,439 | 3/1967 | Tink et al. | 340/172.5 |
| 3,335,407 | 8/1967 | Lauge et al. | 340/172.5 |
| 3,396,377 | 8/1968 | Strout | 340/324 A |
| 3,407,387 | 10/1968 | Looschen et al. | 340/152 |
| 3,439,339 | 4/1969 | Parks | 340/149 A |
| 3,513,298 | 5/1970 | Riddle et al. | 340/149 |

Primary Examiner—Maynard R. Wilbur
Assistant Examiner—William W. Cochran
Attorney—Larson, Taylor and Hinds

[57] ABSTRACT

Apparatus and method to rapidly check the identity of a person against known identifying information prior to permitting that person to charge incurred expenses to the account of a known person. The apparatus and method also provide a system for rapidly recording charged expenses, after checking identity, as being incurred by the known person. The system is particularly useful in hotels and motels where a guest or other known person is permitted to incur expenses at various locations, such as a restaurant, where that person may not be known to the cashier. The person who wishes to make a charge provides the cashier or other employee with his name and other identifying information such as a room number or account number and, prior to recording this charge against the account of the person so identified, the cashier or other employee is provided with a visual display of correct descriptive information for comparison. If the information given by the charging guest is correct, the charges incurred are then recorded against the account of the known person.

7 Claims, 2 Drawing Figures

GUEST IDENTIFICATION APPARATUS AND METHOD

This invention relates to an apparatus and method for checking the identity of a person prior to recording charges incurred by that person as being incurred by a known person.

In another aspect the invention relates to such apparatus and method employed in a hotel, motel, or the like wherein charges are incurred by persons who are usually unknown to the cashier or other employee having the responsibility of approving a credit transaction.

In a hotel, motel, or the like, hereinafter referred to as "hotel," it is customary to permit persons, such as registered guests, to charge the cost of services to their account which is usually identified by a room number. The credit transactions are usually approved by a waitress, cashier, or other hotel employee to whom the guest is usually unknown. While the system is essentially necessary to maintain proper customer relations, it has led to two principal disadvantages: errors in recording the charges against the guest account; and loss of revenue due to guest checkout prior to the time that the incurred expenses have been forwarded to the check out cashier. These problems are quite severe and constitute major cost factors, particularly in larger hotels of, for example, at least 200 rooms. While the latter problem is aggravated by the guest who is careless in regard to incurring late charges, the problem is generally severe even where guests in good faith believe that their late charges are included in their statement at checkout. This is due to the fact that a considerable time may lapse between the credit transaction and checkout. The former problem is a general problem associated with all credit transactions and can certainly lead to a major loss of revenue, particularly where the hotel employees are not well trained.

With the advent of data processing, it has been proposed to overcome these problems by rapidly conveying financial data to the checkout cashier to avoid loss of revenue due to late charges. While this solves the time delay problem, it does not deal with the guest identification problem. Attempts have been made to incorporate further identification information into the system. Most notably it was proposed to record the first three letters of a guest's surname against a room number and all charges were recorded against accounts identified in this manner. However, due primarily to the presence of several guests in a room and to difficulty in reading the first three letters of a signature, this system resulted in a large number of "rejects." That is, in a large number of instances, when a waiter or other employee used the room number and letter identification, the system frequently indicated that the information was incorrect because of an error made by the employee, and not by any error made by the guest. In this instance, the system did not record the charge to any account leading to a loss in revenue.

It is an object of the present invention to provide an apparatus and method for rapidly inquiring into the identity of a person and for recording financial data concerning charges incurred by that person in the financial records of a known person after making that inquiry. It is a further object of the invention to provide such a system which further provides a visual display of financial information to check the accuracy of such financial information prior to recording thereof.

Figure 2:
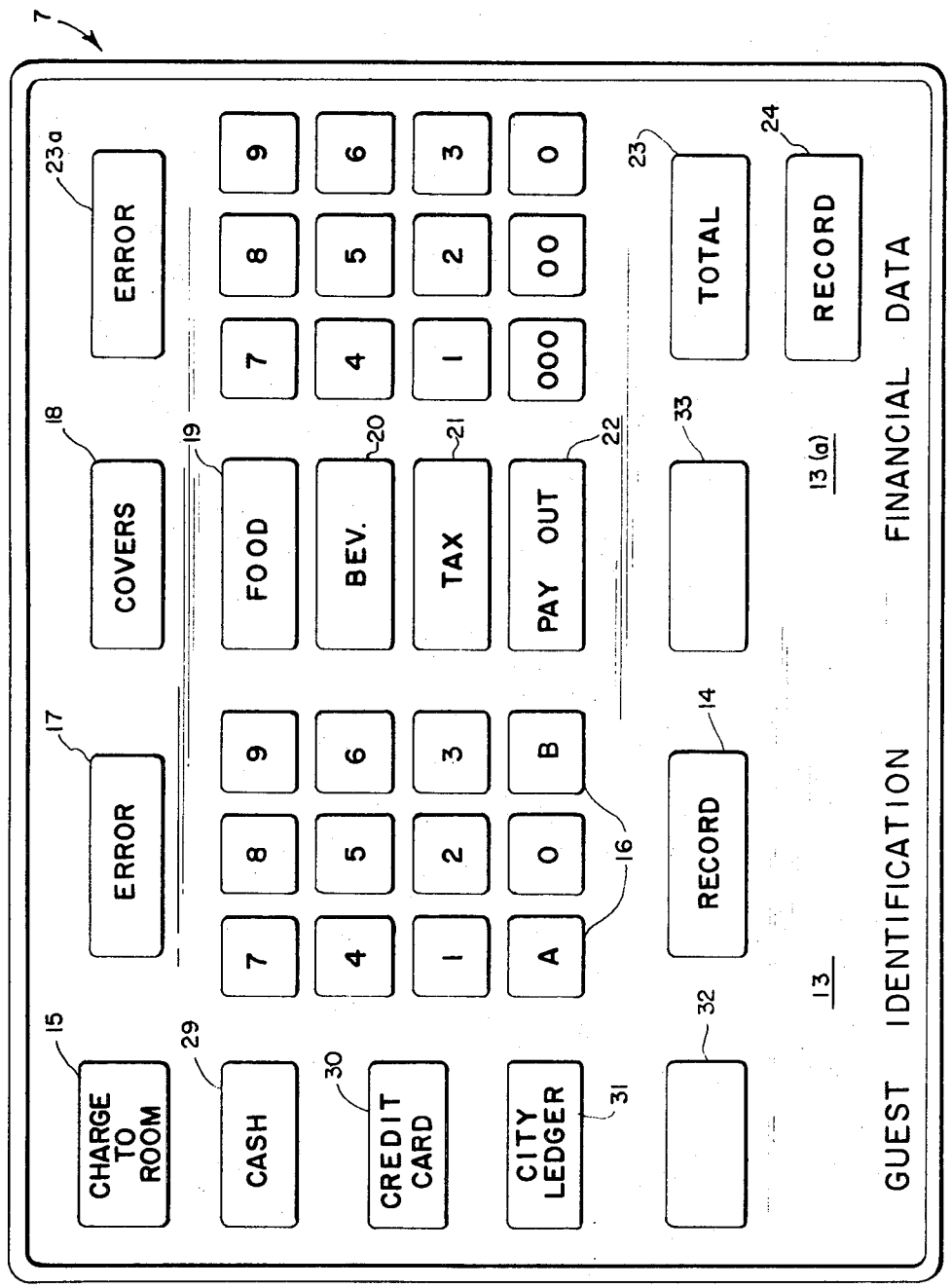

These and other objects are achieved according to the invention in a manner which will be clear from the following detailed description including the drawings in which FIG. 1 is a diagrammatic view of apparatus according to the invention; and FIG. 2 is a diagrammatic view of a satellite station keyboard shown in less detail in FIG. 1.

With reference to the drawings, a typical system according to the invention includes a memory device 1, a reception station 2 including a keyboard 3 and associated visual display device 4, such as a cathode-ray tube, one or more satellite stations 5 which include cathode-ray tube visual display devices 6 and associated keyboards 7, and a check out, or cashier, station 8, including a keyboard 9 and print out device 10.

The memory device 1 can be any electronic device of conventional type or the mechanical or fluidic equivalent thereof. Electronic devices are preferred because of their superior speed. There are several suitable electronic types available including magnetic, plated wire, core memory, and semiconductor memory types. The magnetic types are preferred and include the magnetic disc, drum, tape and wire types and of these the magnetic disc type is preferred. The memory device functions as an information storage means to store descriptive information concerning a person and to record financial charges incurred by that person.

When a person checks into the hotel, he provides certain descriptive information usually including his name and that person then becomes a "known" person as that term is used herein. The term is thus not used in an absolute sense of requiring actual knowledge of the identity of the person. The known person is assigned to a room and the room number is usually also used as descriptive information to identify that person.

Descriptive information concerning the known person is then conveyed to the memory device at the reception station which is conveniently at the registration desk, by means of a keyboard 3 after first displaying this information on a visual display device 4, such as a cathode-ray tube, electronically associated with the keyboard. The visual display is represented as arrow 11. The visual display device 4 provides a means of checking the accuracy of the descriptive information before that information is conveyed into the memory device 1. After the correct descriptive information is visually displayed, it is conveyed to the memory device in the conventional manner as indicated by arrow 12 after which the information is retrievable.

The keyboard 3 located at the reception station is conveniently arranged as a conventional typewriter and has number keys and letter keys for each letter of the alphabet. The keyboard may also be provided with financial data capability such as the U.S. system of dollars and cents. The station is also provided with conventional switches, conveniently mounted on the keyboard, to activate the visual display device 4 and to convey the displayed information to the memory device. The reception station may also be provided with satellite station capability which will be discussed below.

The hotel guest normally charges hotel services such as restaurant services, by providing descriptive information, such as his name and room number, either orally or in writing, to a waiter, cashier, or other hotel employee. This is usually done at a location remote from the registration desk, although it may be done at the registration desk, particularly in a small hotel. In this event, the reception station is conveniently provided with the functions discussed below in connection with satellite stations 5.

Each of the remote stations where such charges are incurred is provided with a satellite station 5 according to the invention. These remote locations include restaurants, bars, valet shops, barber shops, florists, and the like. Each satellite station 5 includes a keyboard 7 and an associated visual display device 6 such as a cathode ray tube.

A person incurring a charge at a remote location, such as a restaurant, is usually unknown to the waiter, cashier, or other hotel employee or employees and will be referred to herein as an "unknown" person. The term is thus not used in the limited sense of a person who is actually unknown to the hotel employee. When a charge is incurred, the unknown person gives descriptive information to enable the hotel employee to record the charge against his account. This information may be in writing or oral and may be of a natural type such as name, address, room number, account number, or the like, or an arbitrary type such as a special identification tag, key, or the like. It is a feature of the present invention that the descriptive information can be entirely of the natural type thereby eliminating the requirement for imposing any obligation upon the guest to have any special identification on his person. It is a further feature of the invention that this descriptive information can be given orally by the unknown person and need not be in writing.

In the usual case, the unknown person will be required to provide his name and room number. The hotel employee then operates the satellite station 5 to inquire into the identity of the unknown person and, after making that inquiry forwards the financial data concerning the charges incurred into the financial records into the record of the known person identified by name and room number. The keyboard 7 can be of any conventional type but it preferably has an arrangement shown in FIG. 2. This arrangement includes a guest identification section 13 and a financial data section 13 (a).

The operator, a waiter, cashier, barber, etc., as the case may be, first utilizes the guest identification section 13 to retrieve from the memory device 1 stores descriptive information concerning a known guest. A typical case would be a restaurant charge of $17.00 for the following: Food $10.00, Beverage $4.00, Tax $0.70, Tip $2.30, total $17.00, four people served, check signed "A. Jones, Room 834." The operator actuates the keys "8," "3" and "4" of section 13 of the keyboard in sequence and then actuates the "record" key 14 to retrieve information concerning the guest or guests registered in room 834. The information retrieved can be any convenient information previously given by the known person assigned to room 834 upon registration. It is generally sufficient to obtain the names of each of the guests registered in that room since such information is routinely given upon registration. Further identification can, of course, be provided and further information can be required to be given by the unknown person. The retrieved information is automatically displayed on the visual display device 6 and is easily compared with the information given by the unknown person. In the event that the two pieces of information do not correspond, the operator makes a further inquiry either of the unknown person or, preferably, within the data-processing system. The latter feature may take several forms but it is preferred to include an alphabetical list capability at the satellite station. To this end, the memory device is provided with the capability of storing an up to date list, in alphabetical order, of all guests registered in the hotel. The list is retrievable, either wholly or in part, at the satellite station by actuating a key, not shown, to visually display same on the visual display device 6. This further inquiry will show that the patron has given the wrong room number or that the records show no such person registered. Where the information given by the unknown person corresponds to that visually displayed for room 834, or when that information has been corrected to correspond thereto, the unknown person is presumed to be the known person and the satellite station is then used to forward the financial data to the memory device as a charge incurred by the known person. In the device illustrated this is accomplished by actuating key 15 followed by keys "8," "3" and "4," which automatically erases the retrieved descriptive information previously displayed and redisplays the room number. In the event that more than one guest is registered in room 834 each guest may be given an arbitrary identification symbol such as "A," "B," etc., in which case this information is included in the displayed descriptive information and is redisplayed by actuating the appropriate key 16. Error key 17 is used to correct any operator errors in visually displaying this information.

The operator next tabulates the financial data. In the example given this is accomplished by actuating: "covers" key 18, followed by key "4"; "food" key 19 followed by keys "1," and "000"; "beverage" key 20 followed by keys "4" and "00"; "tax" key 21 followed by keys "7" and "0"; "pay out" key 22 followed by keys "2," "3" and "0"; and the total key 23 which automatically totals the figures entered. The entire transaction is displayed on the visual display device 6 in the manner keyed and the display provides an opportunity to check the accuracy of the financial data prior to recording same as an expense against Mr. Jones in room 834. Error key 23 is used to correct any operator errors in effecting the visual display. Key 23 is of conventional type and may include a plurality of keys having different functions such as line erase, character erase, total erase, etc., and error key 17 can have similar capability. Once the financial data has been visually checked for accuracy, it is conveyed to the memory device 1 by actuating record key 24.

In FIG. 1, line 25 indicates the inquiry made to retrieve descriptive information from the memory device and line 26 indicates the display of that descriptive information on the display device 6. Line 27 indicates display of the financial data and line 28 indicates recording thereof in the memory device.

The satellite stations are also provided with the capability of handling other transactions such as cash, credit card, city ledger, and others, by means of keys 29–32. The city ledger account is handled in much the same way as the accounts of registered guests except in this instance the patron gives his account number or other conventional identification. This is compared with the descriptive information concerning the known person holding the account in the same manner as indicated above in connection with the registered guest. It is convenient to use account numbers which do not conflict with room numbers. The financial data is conveyed to the account of the known city ledger account holder in the same manner as indicated above in the case of the registered guest except that city ledger key 31 is activated rather than room charge key 15.

For cash transactions, the satellite station is provided with a cash draw and the financial data is displayed and recorded in the memory device in the manner indicated above except that cash key 27 is actuated rather than key 15. In this instance, of course, the device is not used to identify the patron. It will be readily apparent, therefore, that while the device has the capability of making a customer identification, it is not necessary to go through this sequence and thus the financial data can be charged directly to the account of a registered guest or city ledger account holder when the customer is actually known to the waiter or other hotel employee.

A credit card transaction is handled similarly to a cash transaction except that, if desired, the financial data can be charged to different accounts, such as American Express, Diner's Club, etc., by providing additional keys for these accounts or by assigning a code number for each. The financial data is then conveyed by first actuating key 30 followed by the code key or keys in section 13 which can operate to visually display the code or, preferably, the name of the account. The financial data is forwarded to the memory device in the usual manner from which it can be retrieved on a total basis, an account basis, or in any other desired manner.

The keyboard can also be provided with the capability of handling other types of accounts as indicated by blank key 32.

The illustrated keyboard includes a financial data section typical for a restaurant service. Keys 18–22 cover the usual items and the keyboard can be provided with other items indicated by blank key 33. Satellites provided in other locations would include items relevant to that location.

When a registered gust checks out, the cashier utilizes keyboard 9 to retrieve an up to date financial record of all charges against the account of the person checking out. The station can also be provided with a guest identification capability including a visual display device such as a cathode-ray tube to avoid errors in checking out procedures, particularly where the guest does not return a room key when checking out. The request for the financial information is indicated as line 34 in FIG. 1. The financial information is conveyed, as indicated as line 35, to a print out device 10 of conventional type. The device functions to convert electronic information retrieved from the memory device 1 into hard copy, preferably alpha numeric hard copy. A type-out device is conveniently used, although other print out systems employing xerography, thermography, etc., can be used. While the checkout station is shown as remote from the reception station, a single station can be provided with both functions and this is preferred in a smaller hotel. The checkout station can also be provided with full satellite capability in which case it can be utilized both as a satellite station for services rendered in the vicinity thereof as well as a checkout station.

While the memory device has been described as having functions of guest identification and entering financial data into certain accounts, it is to be understood that the device can be provided with a host of additional functions such as those which would be useful in management. For example, the device could be provided with means to retrieve the total amount of revenues for food, for beverages or for any other desired category. The device can also be provided, of course, with capability of storing inventory information or other information useful to management.

As mentioned above, the device can be provided with means to retrieve all or portions of an alphabetized list of registered guests. This is of substantial assistance in a telephone operator station. The operator would be provided with a keyboard to retrieve such list which would be visually displayed on a suitable read out device such as a cathode-ray tube. This would enable the operator to locate the telephone extension of any registered guest when only the guest's name was known. This information would, of course, be available to the telephone operator just as soon as the guest registered.

It will be understood from the foregoing description that the invention contemplates the use of several items such as keyboards, cathode-ray tubes, magnetic disc memory devices, etc., each of which is known per se and known to be electronically interconnected to achieve the functions stated herein by the use of conventional circuits and electronic components.

What is claimed is:

1. A system for use in a hotel or the like in inquiring into the identity of an unknown person and in recording financial data concerning charges incurred by that unknown person in the financial records of a known person after making such inquiry, said system comprising: information storage means for storing descriptive information concerning a known person and financial charges incurred by that known person; a first station comprising descriptive information-conveying means for conveying said descriptive information to said storage means; information retrieval means for retrieving said descriptive information from said storage means; electronic visual display means for visually displaying descriptive information retrieved from said storage means for providing a visual basis for comparison with similar descriptive information given by said unknown person to inquire into the identity of said unknown person prior to recording financial charges incurred by said unknown person in the financial records of said known person; and financial information-conveying means for conveying financial information concerning said charges incurred by said unknown person to said storage means to record said charges as being incurred by said known person, and a second station remote from said first station comprising a further descriptive information-conveying means for conveying descriptive information to said storage means and a further electronic visual display means for displaying the descriptive information conveyed to said storage means, said system further comprising print out means for printing out descriptive and financial information.

2. A system as claimed in claim 1 wherein said first station comprises a satellite station and said second station comprises a reception station within the said hotel.

3. A system as claimed in claim 2 wherein said financial information-conveying means comprises a keyboard actuated means and said electronic display means comprises a cathode-ray tube connected to said keyboard actuated means for displaying financial data entered into said keyboard actuated means and connected to said storage means for displaying information retrieved from said storage means.

4. A system as claimed in claim 3 wherein said descriptive information-conveying means and said financial information-conveying means are combined in a single keyboard actuated unit.

5. A system as claimed in claim 4 further comprising at least one further said first station.

6. An accounting system for a hotel or the like for establishing a plurality of accounts, each distinguished by identifying data, selecting any one of said accounts according to the identifying data therefore, adding financial items into any selected account and summing and printing out the contents of any selected account comprising: an information store, a first keyboard actuated means for generating account identifying data, first display means associated with said first keyboard actuated means for displaying data generated by said first keyboard actuated means, means for transmitting the account identifying data generated by said first keyboard actuated means to said information store for entry therein, a second keyboard actuated means for generating account identifying data, means for transmitting the account identifying information generated by said second keyboard actuated means to said information store for entry therein, first keyboard actuated means for generating financial data, means for transmitting said financial data to said information store for entry therein, second display means for displaying both account identifying data and financial data, means for retrieving data from said information store and supplying the retrieved data to said second display means for display thereby, third keyboard actuated means for generating account-identifying data, means for transmitting the account-identifying information generated by said second keyboard actuated means to said information store for entry therein, print out means and means for retrieving data from said information store and supplying the retrieved data to said print out means, said second keyboard actuated means for generating account-identifying data, said first keyboard actuated means for generating financial data and said second display means being combined at a single terminal located separately from the first keyboard actuated means for generating account-identifying data and the associated first display means and located separately from the third keyboard actuated means for generating account-identifying data and said print out means.

7. An accounting system as claimed in claim 6 wherein said single terminal comprises a satellite terminal and said first keyboard actuated means for generating account-identifying data and the associated first display means are located at a reception station remote from said satellite station.

* * * * *